O. A. MENTZER.
LOCK NUT.
APPLICATION FILED DEC. 10, 1913.
1,101,706.
Patented June 30, 1914.
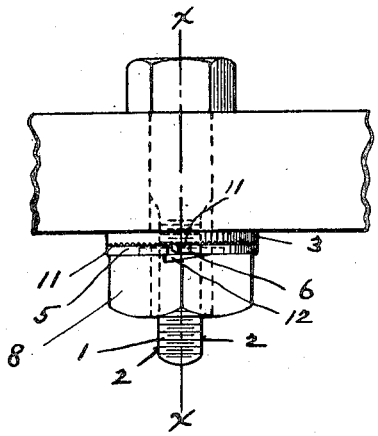
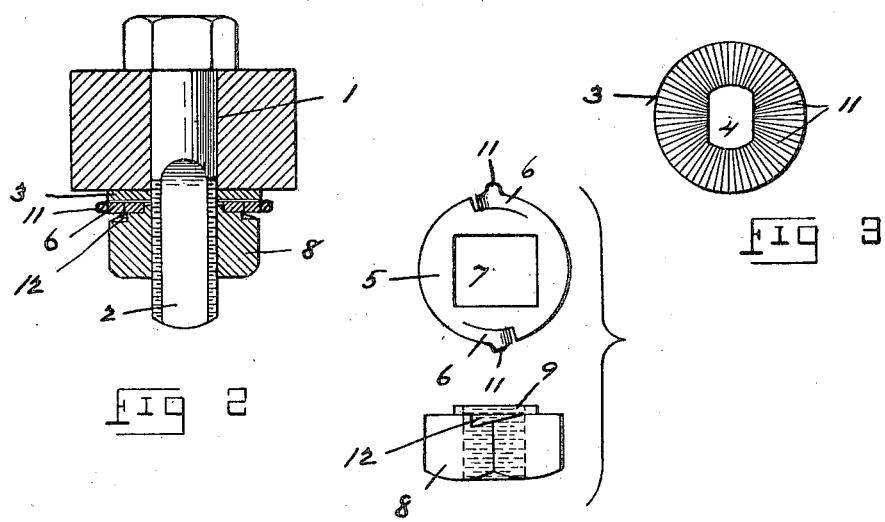
WITNESSES
B. P. Faltin
M. L. Lefevre
INVENTOR
Oliver A. Mentzer,
BY
John J. Thompson
ATTORNEY

UNITED STATES PATENT OFFICE.

OLIVER A. MENTZER, OF LANCASTER, PENNSYLVANIA, ASSIGNOR OF ONE-HALF TO HENRY E. RANSING, OF LANCASTER, PENNSYLVANIA.

LOCK-NUT.

1,101,706.  Specification of Letters Patent.  Patented June 30, 1914.

Application filed December 10, 1913. Serial No. 805,670.

*To all whom it may concern:*

Be it known that I, OLIVER A. MENTZER, a citizen of the United States, residing at Lancaster, in the county of Lancaster and State of Pennsylvania, have invented certain new and useful Improvements in Lock-Nuts, of which the following is a specification, reference being had therein to the accompanying drawing.

This invention relates to a combined bolt and nut lock of that class used in the assembling of machinery, structural or railway work, and is intended to prevent the accidental loosening of the nut.

The object of the invention is to provide an article of this kind that shall consist of few parts, be cheap to manufacture, easily applied and removed, and be adaptable of repeated use.

With these and other objects in view, my invention consists in certain construction and combination of parts as will hereinafter be fully described and claimed in the annexed specification, and illustrated in the accompanying drawings, which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings:—Figure 1, is a side elevation of a bolt and nut, shown in a locked position. Fig. 2, is a vertical sectional view of the same, taken on the line X—X of Fig. 1. Fig. 3, is a plan view of the washer. Fig. 4, is a detail view of the nut and locking washer.

Referring to the drawings, the usual bolt 1, may be used with the exception that it is provided with one or more flatted sides 2, or keyways or grooves (not shown). On the bolt 1, after it is placed in position, is first placed a washer 3, which is provided with a hole 4, of the correct shape to fit the bolt 1, and prevent the washer 3, from turning on the same. The outer surface of said washer 3, is also formed with a series of radial notches or corrugations 11, which act as a ratchet for a locking washer 5, which is next placed on the bolt 1, in contact with the washer 3. Said locking washer 5, is provided with one or more locking tongues or spring pawls 6, which engage the corrugation 11, as said locking washer 5, is rotated against the washer 3. Said washer 5, is further formed with a central orifice 7, which may have three or more sides, and is here shown as a rectangle, and must be large enough to readily pass over the bolt 1. The nut 8, is formed on its rear surface with a central boss 9, of the same shape and size as the orifice 7, and designed to enter the same and prevent any movement between the nut 8, and the locking washer 5. In this manner it will be seen that as the nut 8, is turned down upon the bolt 1, the locking washer 5, is carried with it, and when it is brought into close engagement with the washer 3, the tongues 6, engage the corrugations 11, and as the washer 3, is prevented from turning on the bolt 1, it is impossible for the nut 8, to loosen or back off the bolt 1.

To loosen and remove the nut 8, I have provided on the rear surface of the same, in the path of the tongues 6, a tapered notch 12, to receive the tongues 6, when the same are lifted by pressing on the teats 10 thus disengaging the tongues 6, from the corrugations 11, and allowing the nut to be loosened.

Having thus described my invention what I claim as new, and desire to secure by Letters Patent is:—

1. In a lock-bolt and nut of the class described, the combination with a bolt and nut, of a washer non-rotatable upon said bolt, retaining means consisting of notches formed on the outer surface of said washer, a locking washer adjacent said nut and turning therewith, tongues carried by said locking washer designed to engage said retaining means, means for lifting said tongues out of engagement with said notches, and means provided in the nut to receive said tongues when so lifted.

2. In a lock bolt and nut of the class described, the combination with a bolt and a nut, the bolt provided with one or more flats or grooves, of a washer provided with a central opening conforming to the shape of said bolt, and preventing said washer from turning on the bolt, the outer surface of said washer formed with radial notches, a locking washer formed with a central opening, a boss formed on the nut and designed to enter said opening for the purpose of locking the washer and the nut, tongues formed on said locking washer and designed to engage the notches on the washer preventing the loosening of the nut, said nut provided with notches to receive the tongues when the same are raised to disengage the washer.

3. In a bolt and nut lock of the class described, the combination with a bolt and a nut, of a pair of washers, one of said washers non-rotatable on the bolt, and the other washer non-rotatable with respect to the nut, means carried by said washers whereby they engage each other and are prevented from movement except in a locking direction until released, and means for releasing the same.

In testimony whereof I affix my signature in presence of two witnesses.

OLIVER A. MENTZER.

Witnesses:
HENRY E. RANSING,
JOHN J. THOMPSON.

Copies of this patent may be obtained for five cents each, by addressing the "Commissioner of Patents, Washington, D. C."